May 10, 1932.　　P. ROBBIANO　　1,857,977
DIRECTIONAL SIGNAL
Filed June 1, 1931　　2 Sheets-Sheet 1
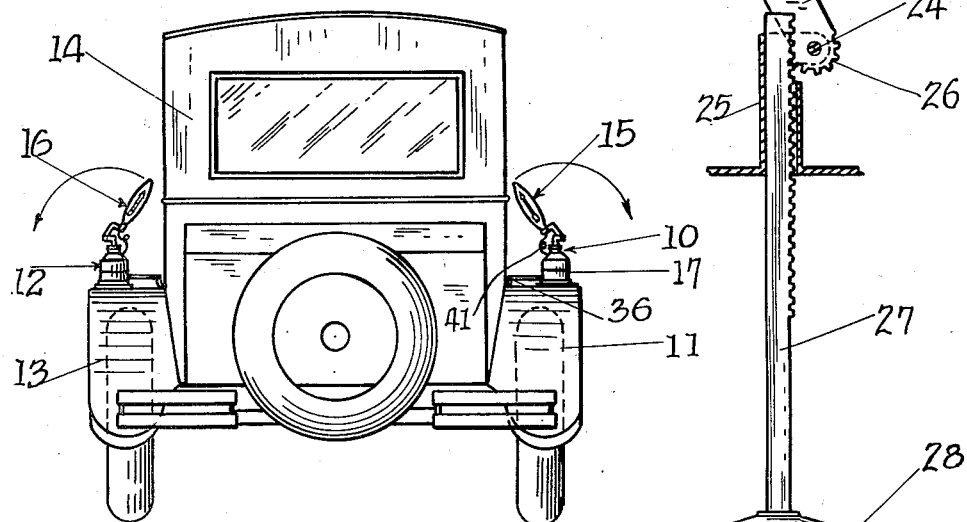
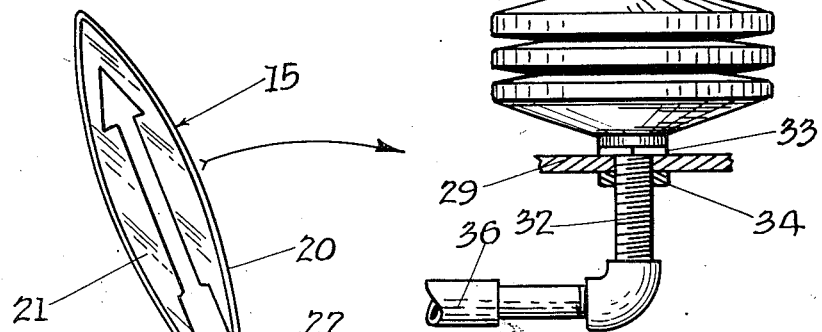
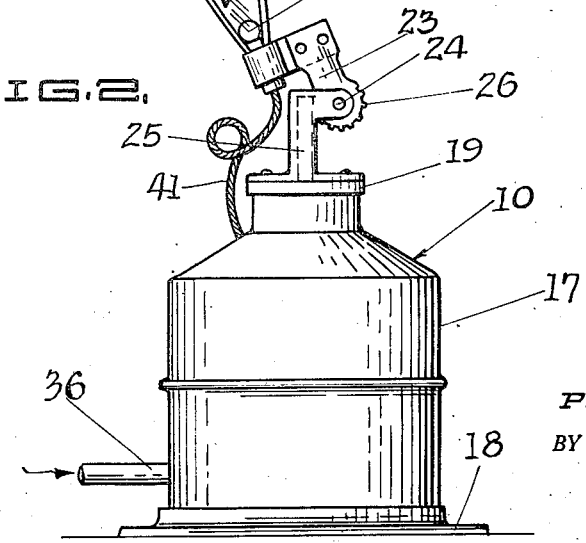
INVENTOR.
PETER ROBBIANO
BY
ATTORNEY May 10, 1932.  P. ROBBIANO  1,857,977
DIRECTIONAL SIGNAL
Filed June 1, 1931   2 Sheets-Sheet 2
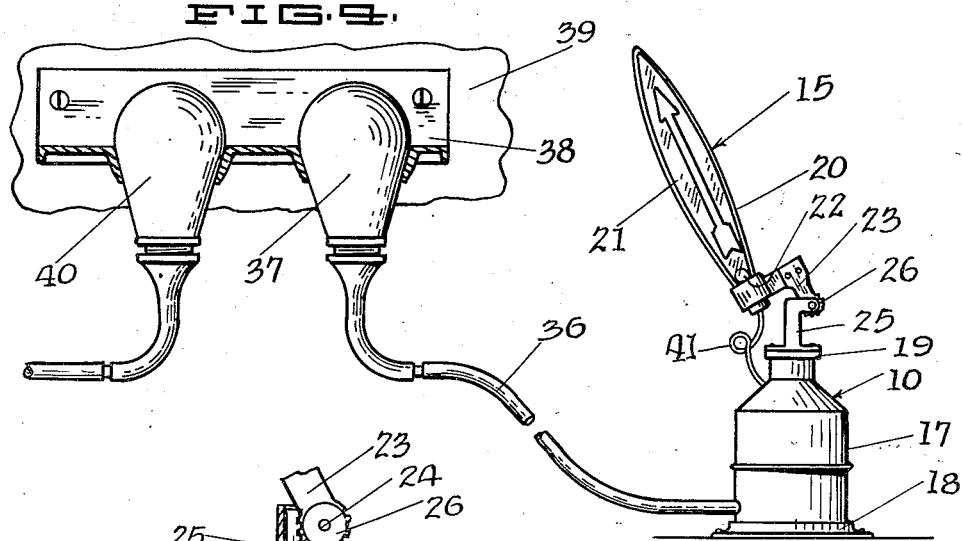
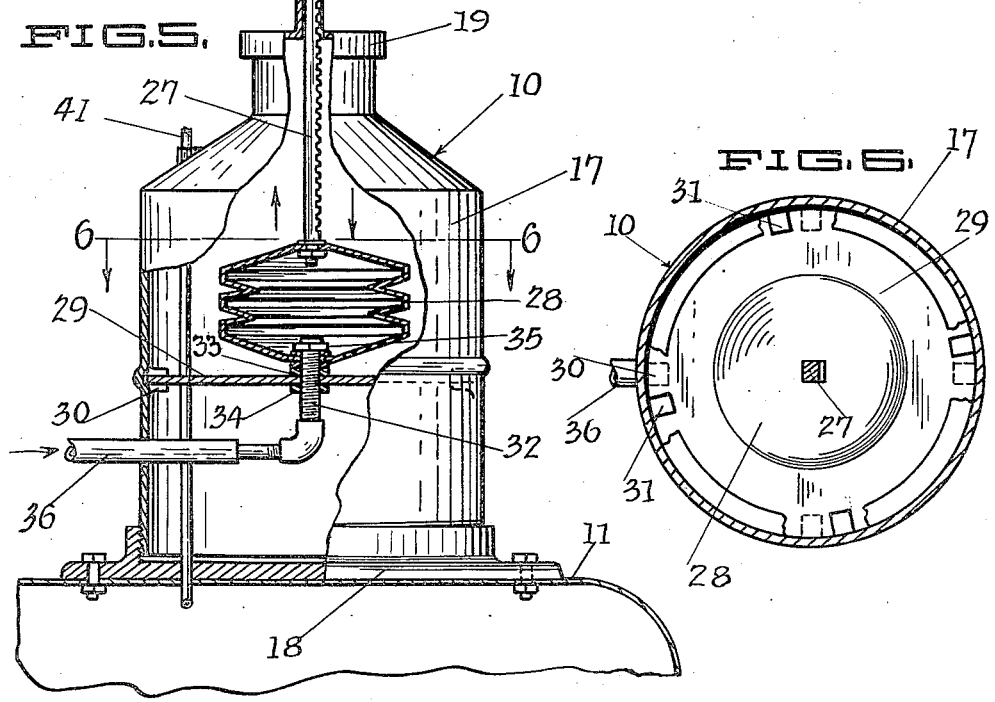
INVENTOR.
PETER ROBBIANO
BY A. C. Carrillo.
ATTORNEY Patented May 10, 1932

1,857,977

UNITED STATES PATENT OFFICE

PETER ROBBIANO, OF LAKEPORT, CALIFORNIA

DIRECTIONAL SIGNAL

Application filed June 1, 1931. Serial No. 541,156.

The present invention relates generally to signalling devices but more particularly to improvements in directional signals for motor-vehicles and includes a system of visible signals placed, preferably, on the rear fenders of the motor vehicle and in such positions as to signal approaching vehicles from the rear and indicating right and left turning movements of the vehicle so equipped.

The signals are placed on the right and left hand rear fenders of the vehicle and comprise casings having signal arms adapted to be wagged independently by means of a system of air operated mechanisms situated in these casings and controlled by means of bulbs situated on the dash board of the vehicle in position to be actuated by the driver of the vehicle.

The primary object of the invention is to provide a system of directional signals having illuminated signal arms of wig-wag character adapted to be swung from a nearly vertical or neutral position to a horizontal position by means of pneumatic mechanism controllable by the vehicle driver.

An additional object of the invention is the provision of a signal of the class described which also provides means for warning pedestrians as well as approaching vehicles.

Another object of the invention is to provide vehicle signals of the class described which are adapted to be mounted on opposite rear fenders of the vehicle, the right hand signal arm being colored blue or green and the left hand one being colored red and independently operable by means of pneumatic controls arranged on the dashboard of the vehicle.

Still another object of the invention is to provide a wig-wag signal of the class described which is simple in construction, effective and noiseless in operation.

Other objects and advantages of the invention will become apparent with reference to the subjoined specification and the accompanying two sheets of drawings in which:—

Figure 1 is a rear view of a vehicle showing the right and left hand signal casings mounted on the rear fenders of the vehicle;

Figure 2 is an enlarged side elevation of the right hand signal as it appears when the signal arm is in neutral position;

Figure 3 is an enlarged detail partly in section illustrating the pneumatic actuating means utilized for actuating the signal arms;

Figure 4 is a diagrammatic view illustrating the right hand signal and the actuating bulb therefor also the actuating bulb for the left hand signal;

Figure 5 is an enlarged elevation partly in section illustrating one of the signal casings and showing the location of the pneumatic actuating means for actuating the signal arms; and Figure 6 is a cross-sectional detail of one of the casings showing the means for holding the actuating mechanism in place in the casing.

Referring more particularly to the drawings and especially to Figure 1 thereof it will be observed that a signal casing 10 is mounted on the right hand fender 11 and a similar signal casing 12 is mounted on the left hand fender of the vehicle 14.

These casings are exactly alike except that their respective signal arms 15 and 16 operate in opposite directions and are colored, respectively, blue or green and red, said signal arms being adapted to be wig-wagged from neutral positions to horizontal positions by means hereinafter described.

The signal casing 10 will be described in detail and consists of a housing 17 of any desired form secured to the fender 11 by means of a flanged fitting 18, as clearly indicated in Figures 2 and 5, the shell or housing preferably being screwed into said fitting and having at its upper end a signal arm supporting neck 19.

The signal arm 15 may be of any configuration and consists of a hollow casing 20 having transparent sides 21 and is illuminated by means of a small bulb 22 located in one end thereof, and energized by means of a cable 41. This arm as thus constructed is swingable in a vertical plane and is pivotally mounted upon the casing by means of a bracket 23, pivoted at the point 24 to a supporting member 25, which member 25 is fixedly mounted upon the casing neck 19.

The lower end of the bracket 23 is provided with a segment 26, which segment meshes at all times with a vertically disposed rack 27 extending through the upper end of the casing and into the member 25, which member holds the rack in contact with the segment 26.

As clearly indicated in Figures 3 and 5 the lower end of the rack 25 is carried by a small bellows member 28, which bellows may be constructed of any resilient material such as rubber or leather.

This bellows is supported in the casing by means of a plate 29 adapted to be seated on lugs 30, carried thereby said plate being inserted in the end of the casing and having open slots 31 adapted to allow the same to pass the lugs after which the plate is turned slightly, as indicated in Figure 6, thus locking the same in position.

The bellows 28 is provided with a centrally disposed threaded inlet stem 32 held in rigid position in the plate 29 by means of jamb nuts 33 and 34 and a nut 35 holds the lower end of the bellows securely to said stem.

The stem 32 is connected by means of a small hose line 36 to the operating bulb 37, Figure 4, which bulb is mounted in a suitable rack 38 carried by the instrument board 39, a similar bulb 40 being mounted adjacent the bulb 37 and adapted to actuate the left hand signal 12.

The operation of the signals is as follows:

The operating bulbs 37 and 40 are placed on the instrument board in convenient reach of the operator and if he desires to turn to the right the bulb 37 is lightly pressed two or three times which causes air to be injected through the line 36 to the bellows 28, the bellows expanding and causing the rock bar 27 to actuate the segment 26 and arm 15.

It will be noted that the bellows is immediately deflated when pressure is released from the bulb and again immediately inflated by additional pressure on said bulb, thus causing the arm 15 to wig-wag back and forth from a neutral upright position to a position slightly below a horizontal position.

Both signals operate in a similar manner and the left hand signal 12 is operated by the bulb 40. Any suitable indicia may be carried by the transparent sides 21 of the signal arms such as an illuminated arrow or other suitable pointer.

What I claim and desire to secure by Letters Patent of the United States is the following:—

In a directional signal of the class described, a cylindrical casing, a swingable signal arm mounted on said casing and comprising an elongated illuminated member adapted for wig-wag motion relative to said casing, a bellows mounted in said casing, an air line connected to the lower end of said bellows, a bulb connected to said air line, a rack member secured to the upper end of said bellows, a pinion carried by the signal arm normally engaging said rack so that when the bellows is expanded the said arm is wig-wagged by virtue of intermittent pressure on said bulb.

In testimony whereof, I hereunto affix my signature.

PETER ROBBIANO.